Figure 1:
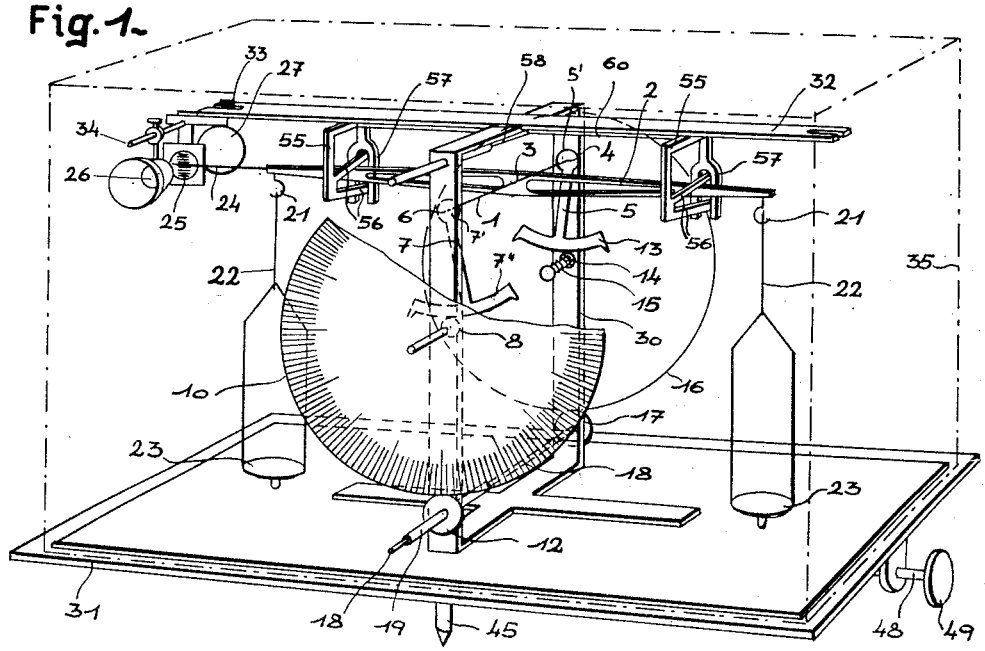

Oct. 14, 1952     G. GORBACH     2,613,926
PRECISION WEIGHING BALANCE

Filed May 26, 1947     3 Sheets-Sheet 1

Georg Gorbach
By [signature]

Oct. 14, 1952　　　　　G. GORBACH　　　　　2,613,926
PRECISION WEIGHING BALANCE

Filed May 26, 1947　　　　　　　　　　　　3 Sheets-Sheet 2

By Georg Gorbach

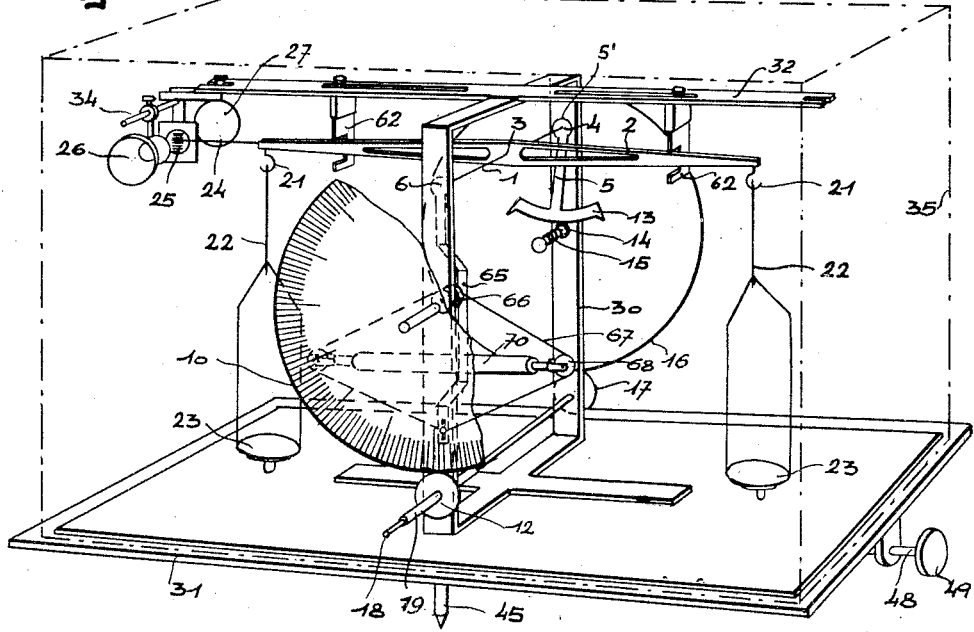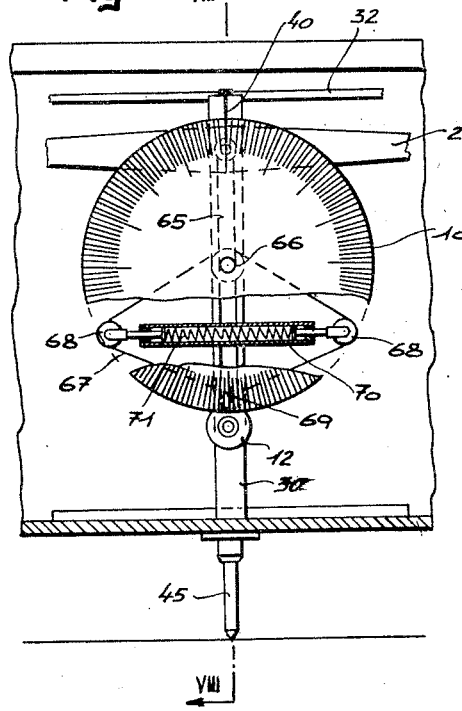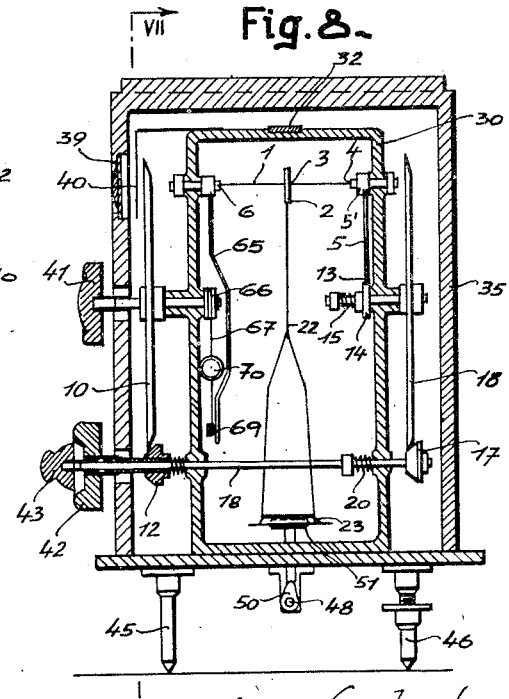

Patented Oct. 14, 1952

2,613,926

UNITED STATES PATENT OFFICE 2,613,926

PRECISION WEIGHING BALANCE

Georg Gorbach, Graz, Austria, assignor to Sartorius-Werke A. G., Gottingen, Germany Application May 26, 1947, Serial No. 750,482

4 Claims. (Cl. 265—59)

This invention relates to precision balances of the torsion type in which the weight of articles is determined by means of the retroactive force of springs which are caused by tension or torsion to return the balance beam to its original zero position after it has been drawn downwards by the load of the article to be weighed, the degree of the tension or torsion of the springs being a measure of the weight and is readable on a scale. Hence, the weight is not ascertained by the deflection of a balance beam as is the case with balances having beams with arms of equal lengths and employing weights of known values and a displaceable rider for determining the last decimals, but is determined by means of the spring force necessary for counterpoising the weight of the load. The advantage of the torsion balances resides in the rapidity with which the weighing operations may be carried out, however, they suffer from the drawback that they can only handle slight loads and that, consequently, their weighing range is restricted. It is true that stronger springs may be more heavily loaded, but they are less sensitive i. e. they do not function if the weight is slight. Balances of this type having a weighing range and a charging capacity of 500 mg. can be used in practice for weighing with precision down to 0.2 mg. or with a charging capacity of about 50 mg. have a weighing precision of about 0.02 mg. Consequently, the relative weighing precision is 500/0.2 or $50/0.002 = 25.10^{-2}$ as compared with the usual balances for chemical analysis in which the charging capacity is 200 g. and the weighing precision 0.1 mg. or with the microchemical balances in which the charging capacity is reduced to 20 g. whereas the weighing precision is $\pm 0.002$ mg. the relative weighing precision being $2.10^{-6}$ and $2.10^{-7}$, respectively. Hence, the relative weighing precision of the known spring balances is reduced by 3 to 4 powers of ten.

With one of the known torsion balances for the indication of the weight use is made of the counterforce of an elastically deformable means for restoring the loaded weighing beam to its zero position, the said means being made of a torsion wire constituting the turning axle of the weighing beam, and one end of which is fixedly mounted, whilst the other end is connected to a device for turning the torsion wire backwards until the beam will have come to rest in the zero-position, thereby indicating the weight. The beam of this known balance consists of two arms which are unsymmetrical as only the one arm is fitted with a hook for the suspension of the weight holder and the load whereas the other arm is provided with a member having a large surface perpendicular to the direction of movement and serving for damping the oscillations of the beam. Besides, a zero-pointer is fitted perpendicularly to the beam and balanced by a counterpoise which is located at the other side of the axis of the torsion wire.

These known balances are highly sensitive in regard to temperature and are greatly influenced by fluctuations of temperature owing to the asymmetry of their beams. The asymmetry of the oscillating system, under the influence of the change of temperature, causes unequal expansions of the arms having different lengths, which though only amounting to several thousands of one millimeter will nevertheless considerably disturb the equilibrium of the balance causing a displacement of the centre of gravity of the oscillating system which reduces the precision of the balance. Besides, owing to the unilateral suspension of the weight on the beam, the torsion wire is subjected to strains and stresses of torsion not only proceeding from the load but also from the weight holder. Consequently, the weight of the load as well as that of the weight-holder must be compensated by turning the torsion wire backwards by means of the weight indicator. Even in case of relatively short and thick torsion wires these heavy weights require a considerable angle of torsion and thus a great angle of readjustment amounting to 180°–250° with the known torsion wire balances. By these considerable torsion angles, however, the fatigue strength of the torsion wire is considerably reduced, and in a relatively short time the weighing precision of the balance becomes impaired by the fatigue stress of the material of the wire. Furthermore, the great angles of torsion render it necessary to establish an empirical scale of weights as a strict proportionality between the angle of torsion and the weights does only exist in case of small angles of torsion. However, it is extremely complicated and takes much time to establish an empirical scale of this kind. Finally, the weighing range of the balance known, having an axle of rotation made of a torsion wire, is a small one, as the relatively heavy weight holders used by chemists will cover a great portion of the torsion angle, so as to leave for the load itself but the end of the weight scale.

The invention relates to a precision balance provided with a torsion wire forming the axle of rotation of the beam, the one end of the wire being fixedly mounted in a manner known;

whereas the other end is connected to an indicator adapted for turning back the torsion wire until the balance beam reaches the zero-position so as to indicate the weight in this manner. The object of the invention is to provide a torsion balance of this kind almost independent of changes in temperature and having a high degree of weighing sensitiveness and weighing precision combined with a high charging capacity. With this object in view, according to the invention the balance beam comprises two weighing arms of equal length each provided with suspension means for weight holders, loads and weights, and the retroactive indicator is provided with a transmission gear converting the slight rotations of the torsion wire into considerable movements of the indicator. By forming the beam of weighing arms having equal length with suspension means i. e. knife edges arranged on both sides, and combining this arrangement with a torsion wire serving as the axle of rotation, it is possible to realize an approximate equilibrium when suspending on both sides weight holders of about the same shape and the same weight and attaching on the one side the load and on the other a weight almost equivalent to the latter. Consequently, the torsion strains and stresses of the wire will be confined to the slight differences in weight remaining. Provided that the torsion wires are relatively thick and hence of great charging capacity, the slight weight to be handled will only result in small deflections, and consequently in but slight torsion strains and stresses so that excessive fatigue strains cannot occur. These slight torsion strains will in any case remain within the range of strict proportionality between the torsion angle and the weight. It is true that the slight torsion strains only call for equally slight retroactive movements which, however, are increased by a suitable transmission gear and may thus be clearly measured and read, especially as the scale over the whole dial may be uniformly divided according to the decadic system in view of the proportionality aforementioned. The gear for increasing the movements of the indicator consequently enables the use of relatively short and thick torsion wires, considering that their small turning angles are not disadvantageous in respect of the weighing precision in case of the balance according to the invention, as these small angles may be converted by the transmission gear into indicator deflections of any size desired. On the other hand, the carrying capacity of such short and thick torsion wires is very great. It has been found particularly advantageous to use a scale dial which is connected to the torsion wire by a transmission gear and rotatable by means of a driving device.

Furthermore, it is advantageous narrowly to confine the range of oscillations of the balance beam, by means used simultaneously for arresting the beam. This double aim is best attained by forks which, for the purpose of arresting the beam, are movable in respect of the latter in which case either the prongs of the forks may be diverging or the balance beam may be provided with portions diverging in respect of the prongs of the forks. According to the invention these forks limiting the deflection of the beam may also be adjustable in respect of a second pair of forks arranged perpendicularly behind the beam. This device for arresting the beam renders it possible to design portable balances as, by the arrest, the beam is fixed and the wire is protected against breakage. By limiting the oscillation range of the beam, the operation of the balance is greatly facilitated as the pointer or indicator arranged on the beam and co-operating with the zero-point scale always remains within the range of visibility of the scale so that the wearisome oscillation to and fro of the weighing beam with its equal arms is avoided during the alternating fixation and removal of weight holders, weights and loads.

For the purpose of rapidly adjusting the beam to zero-position, according to a further embodiment of the invention the fixed end of the torsion wire is connected to a rotatory device which advantageously consists of an arm fitted with a toothed arc adjustable by means of a toothed drive. This adjusting device operates independently of the retroactive weight indicating device for the torsion wire and enables the compensation of the weight holders which often show differences in weight of several milligrams and even such up to several tenths of one gram. After compensation of the weight holders the amount of rotation of the readjusting device plus the weights put on will indicate the exact weight of the load.

Notwithstanding its high sensitiveness the charging capacity of the system according to the invention is very great. A steel wire of 6 cm. length and but 0.1 mm. thickness may be loaded up to 500 g. without risk of breakage. Hence balances may be produced operating with the same relative weighing precision as the usual analytical and microchemical balances. However, the balance according to the invention has the advantage in comparison to the aforesaid balances that the weighing time is noticeably reduced because of the considerable damping effect of the torsion and the limitation of the deflection which does not entail a reduction of the sensitiveness. The new balance is scarcely sensitive in regard to changes in temperature and besides is characterized by an unexpectedly high zero-point constancy. By means of the rotary device mentioned, having a simplified transmission gear, the zero-point may be checked before and after weighing.

Figure 2:
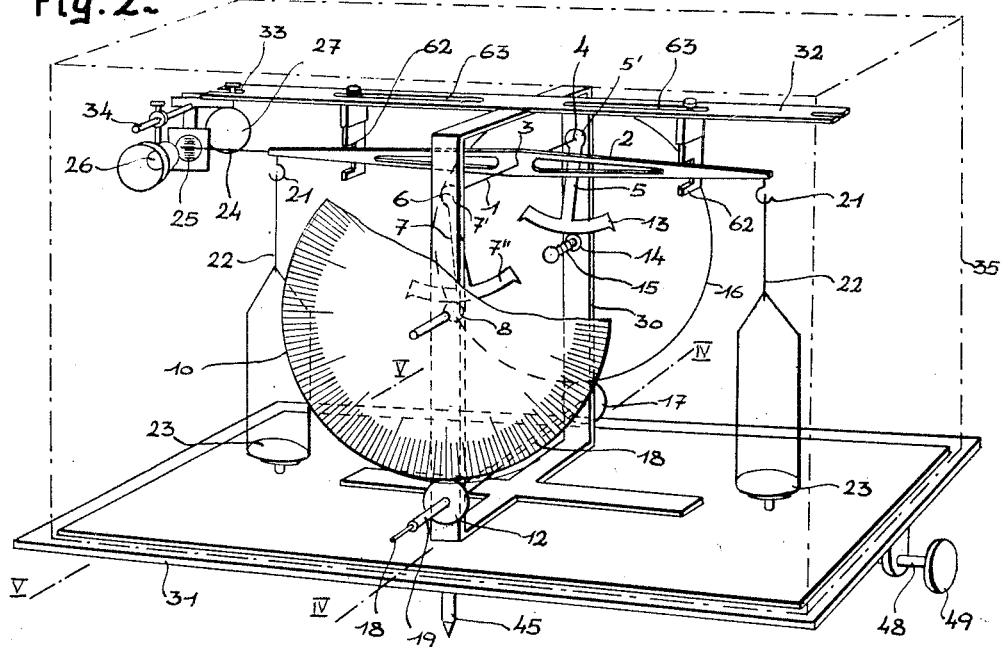
Figure 3:
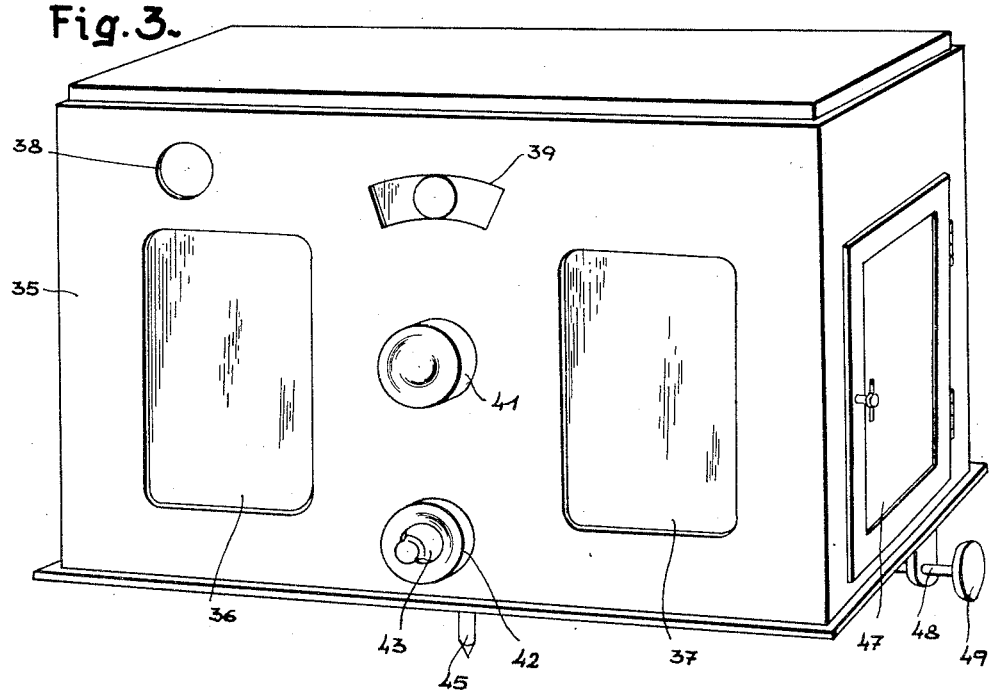
Figure 4:
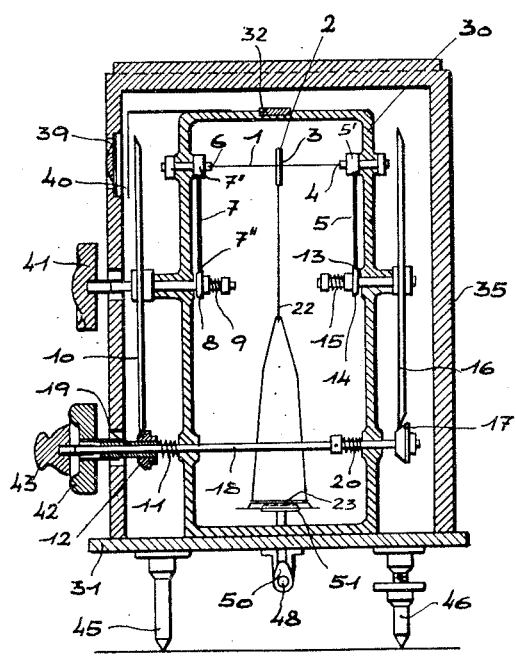
Figure 5:
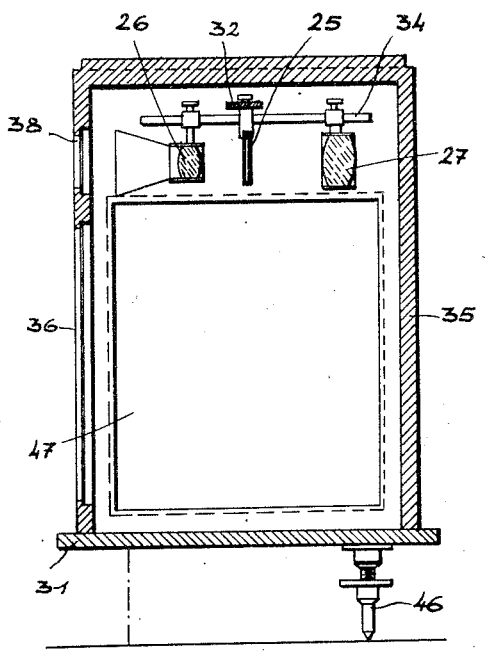

The invention will now be described in connection with the accompanying drawings illustrating by way of example some embodiments of the invention, in which:

Fig. 1 is a perspective view of one embodiment of a balance with a scale dial partly broken off and a casing indicated by dotted lines; Fig. 2 is a view similar to Fig. 1 of another embodiment of a balance; Fig. 3 is a perspective view of the casing in which the balance is housed; Fig. 4 is a vertical section on the line IV—IV of Fig. 2; Fig. 5 is a vertical section on the line V—V of Fig. 2; Fig. 6 is a perspective view similar to Fig. 1 of a third embodiment of a balance; Fig. 7 is a longitudinal section through the middle portion of the balance on the line VII—VII of Fig. 8, and Fig. 8 is a cross section on the line VIII—VIII of Fig. 7. Like reference characters denote like parts in the several figures of the drawings.

According to the two embodiments of the invention shown in Figs. 1 to 5, a balance beam 2 having arms of equal length is non-rotatably connected at its center 3 to a torsion wire 1, e. g, of steel, extending perpendicularly to the beam at both sides thereof.

The one end 4 of the torsion wire is centrally secured to the hub 5' of an arm 5 of the device for adjusting the beam in its precise zero-position. The other end 6 of the wire 1 is centrally secured to the hub 7' of a lever 7 which is provided with a segment 7'' at its free end. This segment is driven by a friction disk 8 resiliently pressed against the segment 7'' by a compression spring 9 (Fig. 4), the disk 8 being connected free rotation with a scale dial 10. A friction disk 12 secured to a hollow shaft 19 which is provided at its free end with a revolving knob 42 is resiliently pressed by means of a compression spring 11 against the circumference of the scale dial 10. By turning the knob 42 the loaded beam 2 may be turned back to its central position under torsion of the wire 1.

The arm 5 is moved by a friction gear consisting of a segment 13 provided at the free end of the arm 5, and of a friction disk 14 which is kept in frictional engagement by a spring 15 with the segment 13. The disk 14 is secured for rotation with a disk 16 cooperating with a friction wheel 17 pressed against the circumference of the disk 17 by a compression spring 20. The wheel 17 is fixedly mounted on the shaft 18 passing through the hollow shaft 19 of the friction disk 12.

Hooks 21 are provided at the ends of the beam 2 for suspending thereon equal weight holders, e. g. weigh-pans 23, by means of hangers 22. At the one end of the beam there is provided a pointer 24 adapted to move along a scale 25. The scale 25 is drawn upon a glass dial in front of which there is located a magnifying optical system 26, and behind the scale there is arranged an illuminating system 27.

The parts of the balance described above are carried by a frame 30 which is secured to a base plate 31. A bearing rail 32 is secured to the upper cross part of the frame 30, and extends along the beam 2. A slot 33 on one end of the rail 32 serves for adjustably mounting a suspension means for the scale 25. The upper part of the suspension means is provided with a cross bar 34 carrying the systems 26 and 27 which can be adjusted along and secured to the cross bar.

The whole balance is housed in a casing 35 placed upon the base plate 31, the front wall of the casing being provided with glass windows 36, 37 situated in front of the scale-pans with the hangers. Furthermore, the front wall of the casing is provided with a glass covered opening 38 arranged centrally to the optical systems 26 and 27 and enabling the observation of the pointer 24 and the scale 25. A segmental glass covered opening 39 which is provided with a magnifying lens serves for observing the scale dial 10 and the pointer 40 which is fixed to the frame 30 and coordinated to the scale dial 10. Through the front wall of the casing pass the ends of the shaft of the scale dial 10, the shaft 11, and the hollow shaft 19, the end of the shaft of the scale dial 10 being provided with a revolving knob 41 for coarse adjustment of the dial 10, the end of the hollow shaft 19 carrying a revolving knob 42 for fine adjustment of the dial 10, and the end of the shaft 18 being provided with a revolving knob 43 for actuating the friction gear 17, 16, and thus for rotating the rear end of the torsion wire 1. Feet 45, 46 mounted to the lower surface of the base plate 31 serve for placing the balance upon a support, e. g. a table or the like. The two rear feet 46 are adjustable in vertical direction. The side walls of the casing 35 are provided with doors 47 through which the weight holders, weights, and the load may be introduced. Below the base plate 31 is arranged longitudinally a shaft 48 carrying at its end laterally projecting from the casing an actuating knob 49. Cams 50 secured to the shaft 48 cooperate with pins of locking discs 51 which support the scale pans in their lifted position and, when lowered, allow the free movement of the balance.

For limiting the deflection of the beam to a very small range of oscillation, as well as for arresting the beam when the balance is not used, e. g. when the balance is transfered to another place, there is provided an arresting device. According to Fig. 1 the arresting device consists of forks 55, the prongs 56 of which embrace the beam near its ends and are diverging and adapted to be moved in horizontal direction to and fro in respect of forks 57 arranged vertically behind the beam. The horizontal movement of the forks 55 is effected by rotation of a stationarily arranged spindle 58 screwed into a rail 60 carrying the forks 55. The rail 60 is guided along the cross part of the frame 30. If the spindle 58 is rotated in the one direction the diverging prongs 56 are moved in their own planes toward the beam, penetrating thereby the forks 57 to a more and more increasing length of the prongs 56. Thus the swing which the beam may carry out between the prongs 56 is more and more reduced until the beam ends become practically wedged between the prongs 56 and are pressed against the front side of the forks 57 whereby the beam is arrested. If the spindle 58 is rotated in the opposite direction, the forks 55 are moved away from the vertical forks 57 and the diverging prongs 56 release the beam.

According to the embodiment shown in Fig. 2 the arresting device for the beam consists of forks 62 which can be moved and fixed in longitudinal slots 63 of the bearing-rail 32 extending along the beam 2. The forks 62 cooperate with the beam 2 tapering wedge-like towards its ends in such a manner that the forks in their outer position allow a limited free movement of the beam. However, if the forks 62 are moved in the slots 63 towards the inner ends of the latter, the forks engage the wedge-like beam and thereby arrest the same.

The balance according to Figs. 6 to 8 is in general, as to its construction, similar to the embodiments shown in Figs. 1 to 5, and differs merely in the design of the transmission gear between the end 6 of the torsion wire 1 and the scale dial 10. The transmission gear used with the balance shown in Figs. 6 to 8 comprises a lever 65 to the hub of which the end 6 of the torsion wire is centrally secured. The lever 65 extends downwards below the shaft of the dial 10 and is connected with the dial through a gear converting the rotation of the dial in swinging or rocking movements of the lever 65, the gear extending from the dial shaft in the direction away from the torsion wire 1. In this manner a very long lever is obtained. A small drum 66 is fixedly mounted to the shaft of the dial 10. On the drum 66 is wound up in several windings a wire or rope shaped transmission means 67. This transmission means runs in the form of a square over idle rollers 68, and its two ends are fastened at 69 near the lower end of the lever 65. The rollers 68 are movably supported in a guiding tube 70 and are uniformly pressed outwards by a spring 71 located within the tube 70. The point of fastening 69 of the transmission wire 67 is peferably adjustable to enable the effective length of the lever 65 to be regulated. Instead of the wire 67 any other flexible transmission means of sufficient tensile strength, e. g. a steel band or the like, may be provided. Principally the parts 65 to 71 constitute a magnifying gear between the scale dial 10 and the one end 6 of the torsion wire which is provided with a particularly long lever 65, the effective length of which may be varied, thus enabling the scale dial 10 to be adjusted.

The operation of the balance in carrying out one weighing procedure is as follows: On both ends of the beam 2 equal weight holders, e. g. weigh pans, crucibles, flasks, for taking up the load are suspended on the hooks 21 whereupon the zero-position of the beam is checked on the scale 25, and, if necessary, is precisely adjusted by turning the revolving knob 43 and thereby the shaft 18, the discs 17, 16 and 14, and the segment 13 with the arm 5 twisting the torsion wire 1. Then the load is introduced into one of the pans and a weight is placed into the other pan, which approximately corresponds to the load applied, whereupon for effecting the fine adjustment of the balance the dial 10 is rotated by turning the knob 42 for twisting the wire 1 until the pointer 24 points to zero on the scale 25. The amount of rotation of the dial 10 plus the weight applied to the one pan or the like, which is indicated by the pointer 40, corresponds to the exact weight of the load. If the load is small, e. g. up to about 10 mg., no weights are required to be imposed, the amount of the rotation of the dial 10 indicating the weight of the load which may be placed in a pan duly compensated in regard to the weight holders suspended on the hook 21. Before the fine adjustment of the dial 10 is effected, a coarse adjustment of the dial 10 may be carried out, if desired, by turning the knob 41.

While the invention has been shown in the particular embodiments described, it is not limited thereto as modifications thereof may be made without departing from the scope of the appended claims.

I claim:

1. Precision weighing balance comprising a balance beam, a straight torsion wire fixed to the centre of said beam, constituting the axis of rotation of said beam and extending perpendicularly to said beam at both sides thereof, a zero adjustment device for adjusting the balance beam in unloaded condition to its horizontal or zero-position comprising an arm secured to the end of said torsion wire at one side of said beam, a disk, a shaft for said disk, a drive for rotating said disk and a gear between said arm and said disk for converting the rotating movement of said disk into an angular movement of said arm, and a weight indicator for twisting said torsion wire and readjusting the loaded balance beam to its horizontal or zero-position, comprising a rocking lever secured to the end of said torsion wire at the other side of said beam, a dial, a shaft for said dial, a drive for rotating said dial and a gear between said rocking lever and said dial for converting the rotating movement of said dial into an angular movement of said rocking lever.

2. Precision weighing balance comprising a balance beam, a straight torsion wire fixed to the centre of said beam, constituting the axis of rotation of said beam and extending perpendicularly to said beam at both sides thereof, a zero adjustment device for adjusting the balance beam in unloaded condition to its horizontal or zero-position comprising an arm secured to the end of said torsion wire at one side of said beam, a disk, a shaft for said disk, a drive for rotating said disk and a gear between said arm and said disk for converting the rotating movement of said disk into an angular movement of said arm, and a weight indicator for twisting said torsion wire and readjusting the loaded balance beam to its horizontal or zero-position, comprising a rocking lever secured to the end of said torsion wire at the other side of said beam, a dial, a shaft for said dial, a drive for rotating said dial and a gear between said rocking lever and said dial for converting the rotating movement of said dial into an angular movement of said rocking lever, said gear comprising a segment on said locking lever and a friction disk on the shaft of said dial in engagement with said segment.

3. Precision weighing balance comprising a balance beam, a straight torsion wire fixed to the centre of said beam, constituting the axis of rotation of said beam and extending perpendicularly to said beam at both sides thereof, a zero adjustment device for adjusting the balance beam in unloaded condition to its horizontal or zero-position comprising an arm secured to the end of said torsion wire at one side of said beam, a disk, a shaft for said disk, a drive for rotating said disk and a gear between said arm and said disk for converting the rotating movement of said disk into an angular movement of said arm, and a weight indicator for twisting said torsion wire and readjusting the loaded balance beam to its horizontal or zero-position, comprising a rocking lever secured to the end of said torsion wire at the other side of said beam, a dial, a shaft for said dial, a drum on said shaft, a drive for rotating said dial, and a gear between said rocking lever and said dial for converting the rotating movement of said dial into an angular movement of said rocking lever, said gear comprising a transmission rope connected to said rocking lever and wound around said drum and idle rollers adapted to guide said rope in the form of a square.

4. Precision weighing balance comprising a balance beam, a straight torsion wire fixed to the centre of said beam, constituting the axis of rotation of said beam and extending perpendicularly to said beam at both sides thereof, a zero adjustment device for adjusting the balance beam in unloaded condition to its horizontal or zero-position comprising an arm secured to the end of said torsion wire at one side of said beam, a disk, a shaft for said disk, a drive for rotating said disk and a gear between said arm and said disk for converting the rotating movement of said disk into an angular movement of said arm, and a weight indicator for twisting said torsion wire and readjusting the loaded balance beam to its horizontal or zero-position, comprising a rocking lever secured to the end of said torsion wire at the other side of said beam, a dial, a shaft for said dial, a drum on said shaft, a drive for rotating said dial and a gear between said rocking lever and said dial for converting the rotating movement of said dial into an angular movement of said rocking lever, said gear comprising a transmission rope connected to said rocking lever and wound around said drum and idle rollers adapted to guide said rope in the form of a square, the point of connection of said rope to said rocking lever being adjustable to and fro in respect of the rocking centre of said lever.

GEORG GORBACH.

REFERENCES CITED

The following references are of record in the file of this patent:

UNITED STATES PATENTS

| Number | Name | Date |
|---|---|---|
| 340,008 | Roeder | Apr. 13, 1886 |
| 1,579,273 | Wright | Apr. 6, 1926 |
| 2,225,566 | Ide | Dec. 17, 1940 |
| 2,303,162 | Godwin | Nov. 24, 1942 |
| 2,352,906 | Lyons | July 4, 1944 |

FOREIGN PATENTS

| Number | Country | Date |
|---|---|---|
| 461,075 | Great Britain | Feb. 9, 1937 |